United States Patent
Itou et al.

(10) Patent No.: US 8,812,197 B2
(45) Date of Patent: Aug. 19, 2014

(54) HYBRID WHEEL LOADER

(75) Inventors: Noritaka Itou, Ushiku (JP); Satoru Kaneko, Naka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 11 days.

(21) Appl. No.: 13/697,150

(22) PCT Filed: May 27, 2011

(86) PCT No.: PCT/JP2011/062257
§ 371 (c)(1),
(2), (4) Date: Nov. 9, 2012

(87) PCT Pub. No.: WO2011/149070
PCT Pub. Date: Jan. 12, 2011

(65) Prior Publication Data
US 2013/0071214 A1 Mar. 21, 2013

(30) Foreign Application Priority Data

May 27, 2010 (JP) ................................. 2010-121389

(51) Int. Cl.
| | | |
|---|---|---|
| *G06F 7/70* | (2006.01) | |
| *E02F 9/20* | (2006.01) | |
| *B60K 6/48* | (2007.10) | |
| *B60K 6/485* | (2007.10) | |
| *E02F 3/34* | (2006.01) | |
| *E02F 9/22* | (2006.01) | |
| *B60K 17/356* | (2006.01) | |
| *E02F 3/28* | (2006.01) | |
| *B60L 7/10* | (2006.01) | |
| *B60L 11/00* | (2006.01) | |
| *B60L 11/14* | (2006.01) | |

(52) U.S. Cl.
CPC .............. *E02F 9/2058* (2013.01); *B20W 20/00* (2013.01); *B60K 6/48* (2013.01); *B60K 6/485* (2013.01); *B60K 2006/4816* (2013.01); *B60W 2300/17* (2013.01); *E02F 3/3411* (2013.01); *E02F 9/2075* (2013.01); *E02F 9/2253* (2013.01); *Y02T 10/6221* (2013.01); *Y02T 10/6226* (2013.01); *Y02T 10/6256* (2013.01); *B60K 17/356* (2013.01); *E02F 3/28* (2013.01); *Y10S 903/903* (2013.01); *E02F 9/2091* (2013.01); *B60W 2300/50* (2013.01); *B60L 7/10* (2013.01); *B60L 11/005* (2013.01); *B60L 11/14* (2013.01); *B60L 2200/40* (2013.01); *Y02T 10/7077* (2013.01); *Y02T 10/7022* (2013.01)
USPC ............ 701/50; 701/51; 903/903; 180/65.26; 180/242; 414/685

(58) Field of Classification Search
CPC .............. B60K 6/48; B60K 6/28; B60K 6/54; B60K 6/26; B60K 1/04; B60K 2006/4816; B60K 17/356; E02F 3/402; E02F 9/2075; B60L 2200/44; B60W 10/26; B60W 10/08; B60W 20/00; Y02T 10/6226
USPC ................. 701/22, 36, 50, 51, 54; 180/65.21, 180/65.26, 65.265, 242; 903/903; 414/685
See application file for complete search history.

(56) References Cited

U.S. PATENT DOCUMENTS

| | | | | |
|---|---|---|---|---|
| 5,841,201 A | * | 11/1998 | Tabata et al. ................. | 290/40 C |
| 2002/0148144 A1 | | 10/2002 | Tokunaga | |
| 2004/0040810 A1 | * | 3/2004 | Notsu et al. .................. | 192/3.54 |

FOREIGN PATENT DOCUMENTS

| | | |
|---|---|---|
| CA | 2 109 321 A1 | 11/1992 |
| JP | 2-43421 A | 2/1990 |

(Continued)

OTHER PUBLICATIONS

International Search Report dated Jun. 21, 2011 (two (2) pages).

(Continued)

*Primary Examiner* — Gertrude Arthur Jeanglaude
(74) *Attorney, Agent, or Firm* — Crowell & Moring LLP

(57) ABSTRACT

A hybrid wheel loader includes: an engine that includes an output shaft; a motor/generator that includes a rotating shaft directly attached to the output shaft of the engine; a transmission that includes an input shaft attached to the rotating shaft of the motor/generator, and an output shaft; a propeller shaft disposed on an output side of the transmission and driven via the output shaft of the transmission; an electricity storage device; and a control device that stores electricity into the electricity storage device by collecting electrical energy at the motor/generator.

10 Claims, 11 Drawing Sheets

(56) References Cited

FOREIGN PATENT DOCUMENTS

Figure 1:
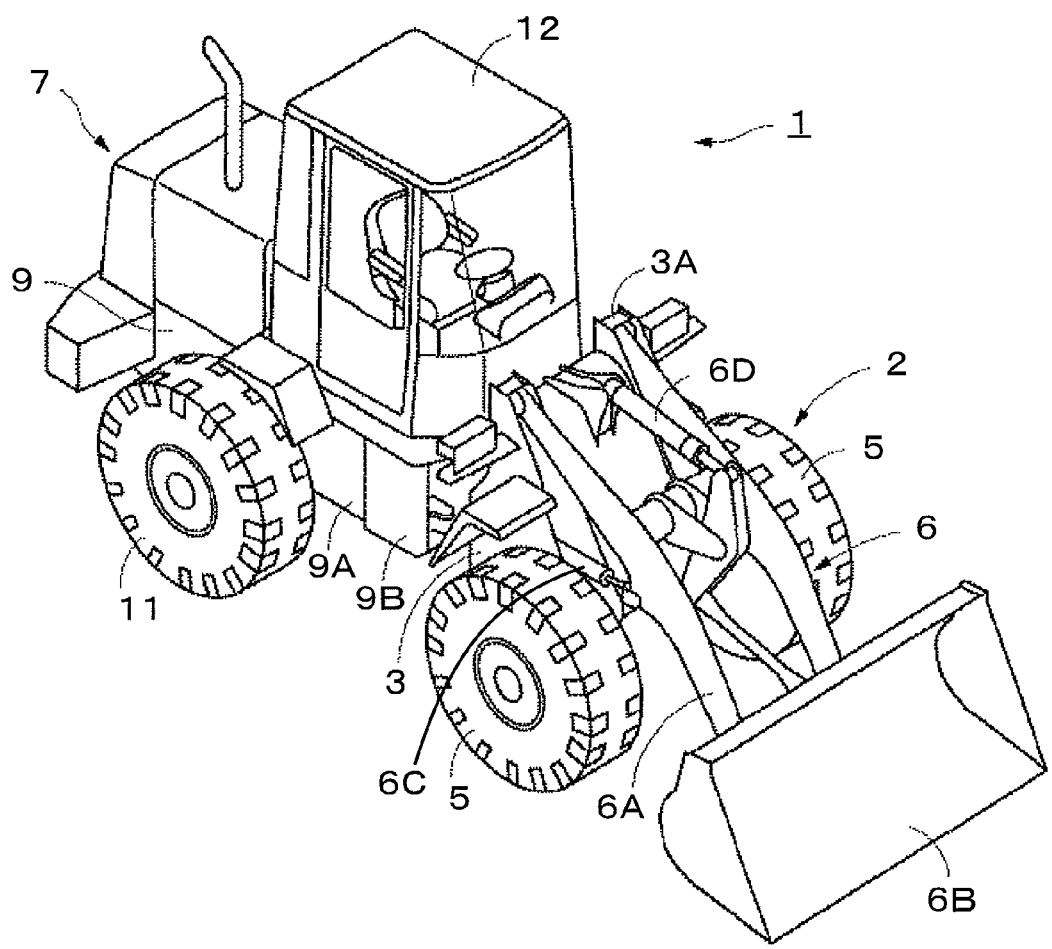

| | | |
|---|---|---|
| JP | 7-505591 A | 6/1995 |
| JP | 11-81388 A | 3/1999 |
| JP | 2001-275206 A | 10/2001 |
| JP | 2002-315105 A | 10/2002 |
| JP | 2003-237394 A | 8/2003 |
| JP | 2003-294130 A | 10/2003 |
| JP | 2004-159440 A | 6/2004 |
| JP | 2008-247269 A | 10/2008 |
| JP | 2008-290594 A | 12/2008 |
| JP | 2009-241828 A | 10/2009 |
| JP | 2009-241829 A | 10/2009 |
| JP | 2009-241830 A | 10/2009 |
| JP | 2010-111188 A | 5/2010 |

OTHER PUBLICATIONS

Japanese Office Action dated Apr. 9, 2013 (two (2) pages).

* cited by examiner

HYBRID WHEEL LOADER

TECHICAL FIELD

The present invention relates to a hybrid wheel loader.

BACKGROUND ART

In a hybrid wheel loader in the known art, an engine and a motor are used as a motive power sources. During excavation work or loading work, which such a hybrid wheel loader performs by using its bucket, it may require a drive force greater than that required for traveling operation. As a means for addressing this need, a dynamo-electric motor also fulfilling a function as a generator is utilized in the known art (see, for instance, patent literature 1). In this type of hybrid wheel loader, electrical energy generated by the generator is charged into a capacitor (electricity storage device) while the accelerator is in an off state and the dynamo-electric motor is driven as a motor during excavating or loading via the electricity storage device having been charged, so as to supplement the drive power provided by the engine.

The hybrid wheel loader disclosed in the prior art literature cited above includes a gear train disposed between the engine and a torque converter, with the dynamo-electric motor also functioning as a generator (motor/generator) mounted coaxially with the output shaft of the gear train.

CITATION LIST

Patent Literature

Patent literature 1: Japanese Laid Open Patent Publication No. 2002-315105

SUMMARY OF THE INVENTION

Technical Problem

While the description of the hybrid wheel loader in the patent literature cited above does not include any mention of regeneration of electrical energy at the motor/generator, the charge capacity with which the electricity storage device is charged may be improved in the hybrid wheel loader structured as described above by regenerating electrical energy at the motor/generator when the traveling speed of the hybrid wheel loader becomes lower. However, a hybrid wheel loader equipped with a torque converter cannot be expected to acquire much regenerative energy, since slippage is bound to occur at the torque converter. In addition, the presence of the gear train disposed between the torque converter and the motor/generator makes it even more difficult to regenerate electrical energy.

Solution to Problem

According to the 1st aspect of the present invention, a hybrid wheel loader comprises: an engine that includes an output shaft; a motor/generator that includes a rotating shaft directly attached to the output shaft of the engine; a transmission that includes an input shaft attached to the rotating shaft of the motor/generator, and an output shaft; a propeller shaft disposed on an output side of the transmission and driven via the output shaft of the transmission; an electricity storage device; and a control device that stores electricity into the electricity storage device by collecting electrical energy at the motor/generator.

According to the 2nd aspect of the present invention, it is preferred that the hybrid wheel loader according to the 1st aspect further comprises: a traveling dynamo-electric motor disposed on an output axis of the propeller shaft.

According to the 3rd aspect of the present invention, it is preferred that in the hybrid wheel loader according to the 2nd aspect, the traveling dynamo-electric motor is disposed inside a front frame.

According to the 4th aspect of present invention, it is preferred that in the hybrid wheel loader according to the 2nd or 3rd aspect, when a tractive force provided by the engine is not sufficient, the control device drives the traveling dynamo-electric motor with electric power from the electricity storage device.

According to the 5th aspect of the present invention, it is preferred that in the hybrid wheel loader according to the 4th aspect, the control device drives the traveling dynamo-electric motor with electric power from the electricity storage device at a traveling operation start.

According to the 6th aspect of the present invention, the hybrid wheel loader according to the 4th or 5th aspect may further comprise: a bucket that swings upward/downward; and a height detector that detects a height of the bucket, wherein: upon deciding that the height of the bucket detected by the height detector is smaller than a predetermined height, the control device drives the traveling dynamo-electric motor with electric power from the electricity storage device.

According to the 7th aspect of the present invention, the hybrid wheel loader according to the 6th aspect may further comprise: a cylinder that causes the bucket to swing upward/downward; and a pressure detector that detects a pressure at the cylinder, wherein: upon deciding that the pressure at the cylinder detected by the pressure detector is greater than a first pressure, the control device drives the traveling dynamo-electric motor with electric power from the electricity storage device.

According to the 8th aspect of the present invention, it is preferred that in the hybrid wheel loader according to the 7th aspect, upon deciding that the pressure at the cylinder detected by the pressure detector is equal to or greater than a second pressure that is higher than the first pressure, the control device drives the motor/generator with electric power from the electricity storage device.

According to the 9th aspect of the present invention, it is preferred that in the hybrid wheel loader according to the 7th or 8th aspect, upon deciding that the treasure at the cylinder detected by the pressure detector is less than the first pressure while the driving dynamo-electric motor with electric power from the electricity storage device, the control device stops driving the traveling dynamo-electric motor.

According to the 10th aspect of the present invention, it is preferred that in the hybrid wheel loader according to any one of the 1st through 9th aspects, if a charge quantity, indicating an extent to which the electricity storage device is charged, is less than a predetermined quantity during deceleration, the control device stores electrical energy at the motor/generator and the traveling dynamo-electric motor into the electricity storage device.

According to the 11th aspect of the present invention, it is preferred that in the hybrid wheel loader according to any one of the 1st through 10th aspect, structured so as to allow the motor/generator, attached to the output shaft of the engine, to be disengaged for replacement with a flywheel and a torque converter.

Advantageous Effect of the Invention

According to the present invention characterized in a motor/generator directly connected to the output shaft of an engine, the electrical energy regeneration capability with which the electrical energy is regenerated at the motor/generator can be improved.

BRIEF DESCRIPTION OF THE DRAWINGS (FIG. 1) A perspective providing an external view of a hybrid wheel loader achieved in an embodiment of the present invention (FIG. 2) A top view of the hybrid wheel loader in FIG. 1

(FIG. 3) A side view of the hybrid wheel loader in FIG. 1

Figure 2:
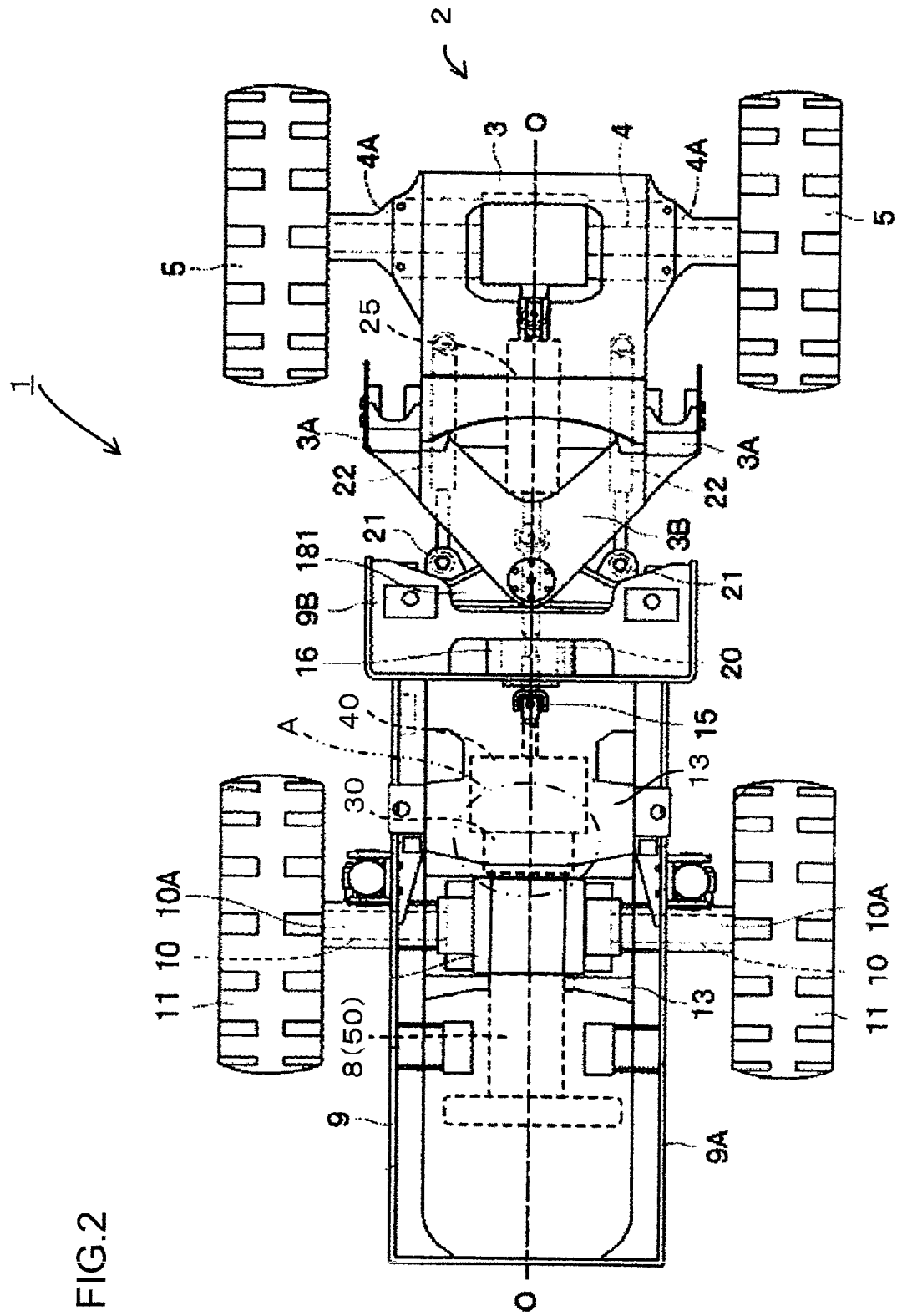

(FIG. 4) An enlarged sectional view showing in detail an area A of the hybrid wheel loader in FIG. 2

Figure 4:
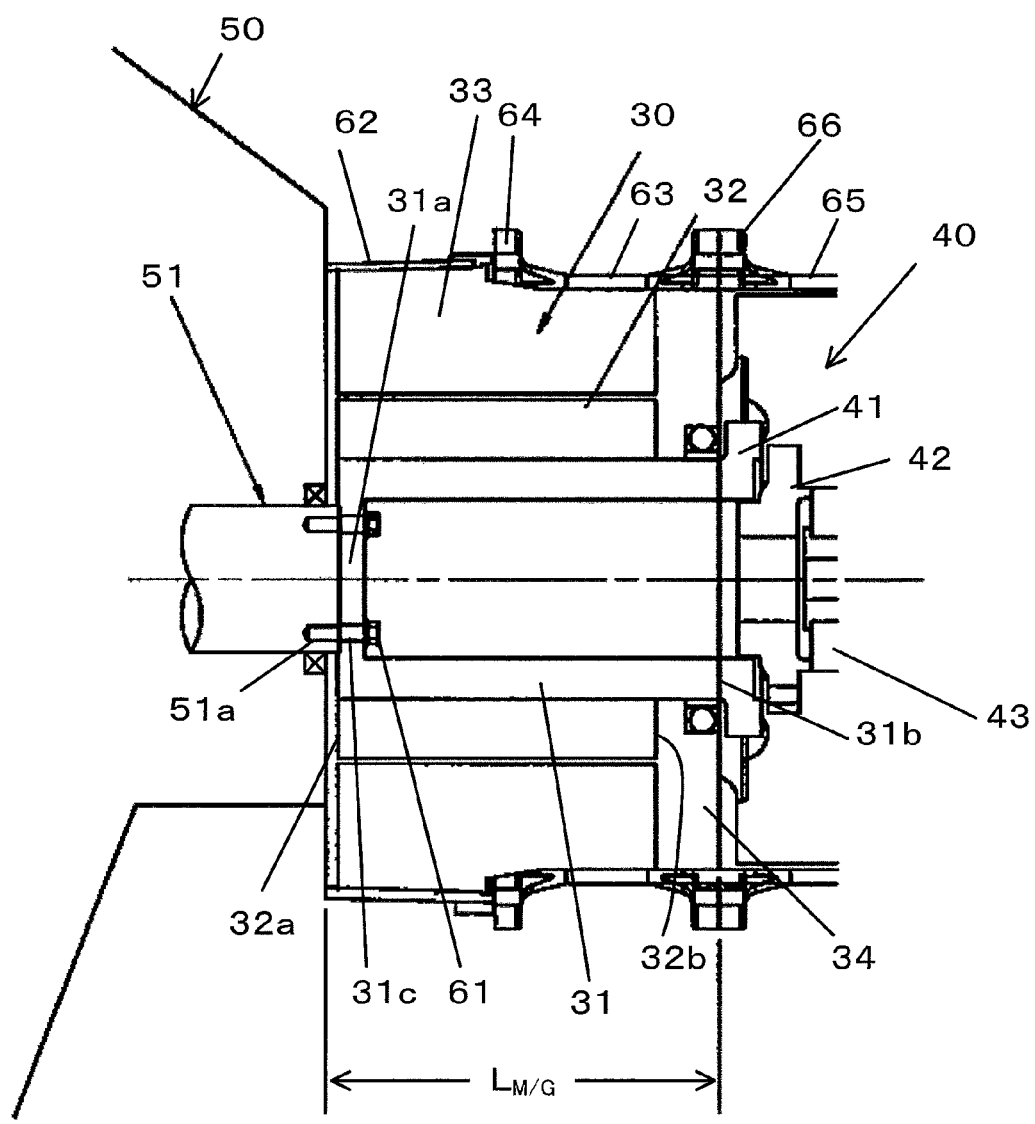

(FIG. 5) An illustration of a structure that includes a device, such as a torque converter, replacing the motor/generator in FIG. 4

(FIG. 6) A sectional view of a standard structure likely to be assumed in an area corresponding to the area A in FIG. 4, presented as a comparison example to facilitate comparison of the structure in the area A with the structure in a regular wheel loader (FIG. 7) A system block diagram pertaining to the hybrid wheel loader according to the present invention (FIG. 8) A diagram illustrating how automatic gear shifting is achieved according to the present invention (FIG. 9) An illustration of a V-pattern loading operation executed with the hybrid wheel loader (FIG. 10) An illustration of an excavating operation executed with the hybrid wheel loader (FIG. 11) A processing flowchart pertaining to the excavating operation executed with the hybrid wheel loader according to the present invention

DESCRIPTION OF EMBODIMENT

The following is a detailed description of a hybrid wheel loader achieved in an embodiment of the present invention, given in reference to drawings.

Figure 3:
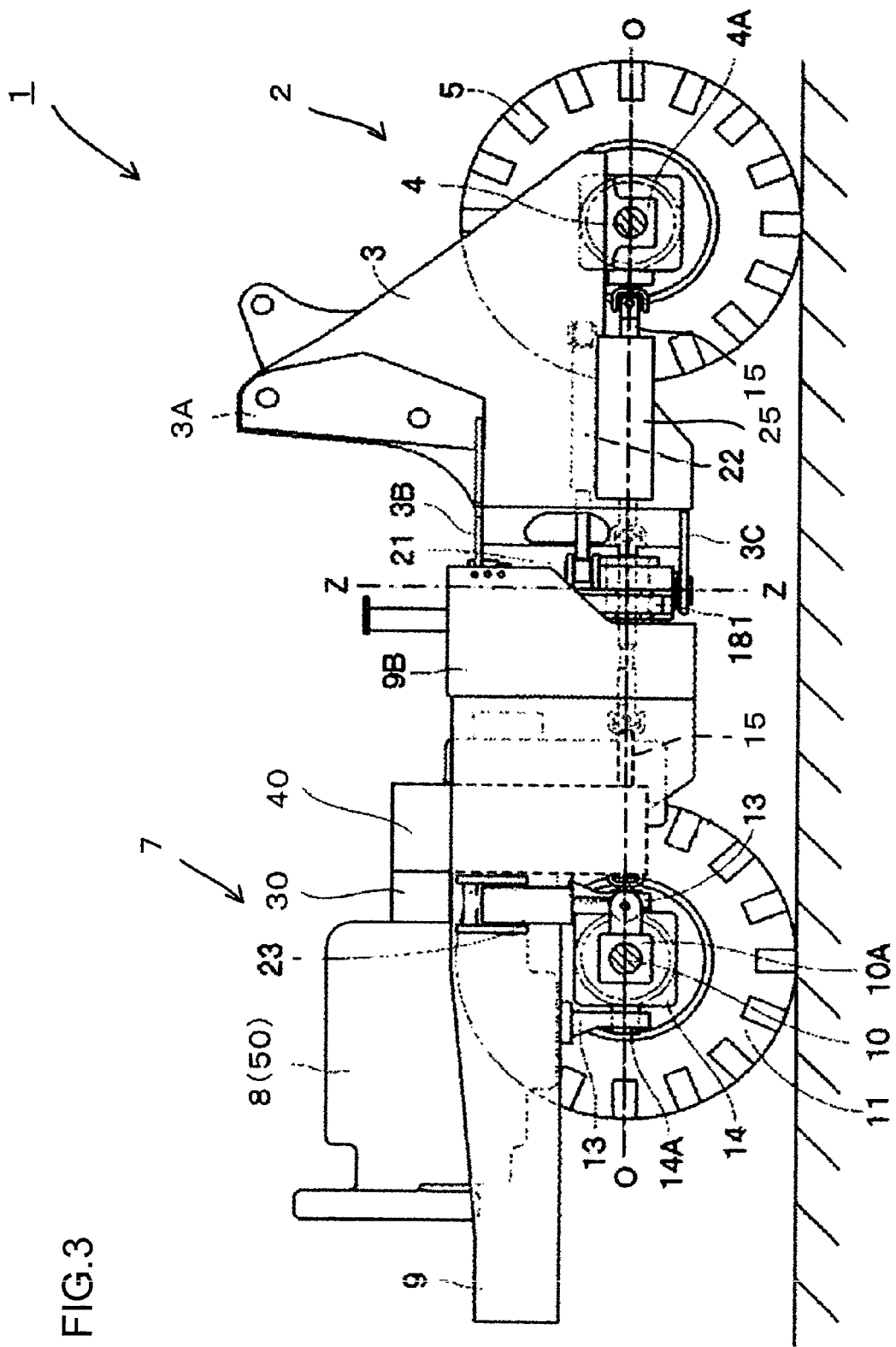

FIG. 1 is a perspective presenting an external view of a hybrid wheel loader, FIG. 2 is a top view of the hybrid wheel loader shown in FIG. 1 and FIG. 3 is a side view of the hybrid wheel loader shown in FIG. 1. It is to be noted, however, that neither FIGS. 2 nor 3 includes an illustration of the work device shown in FIG. 1.

A hybrid wheel loader 1, to be described in reference to FIGS. 1~3, is an articulated work machine which includes a front body 2 and a rear body 7 linked via a joining frame 181 so that they are able to articulate.

The front body 2, located on the front side of the hybrid wheel loader 1, includes a front frame 3 formed to assume a substantially box-like shape, a front axle 4 disposed on the lower side of the front frame 3, front wheels 5 disposed at the left and right ends of the front axle 4 and a work device 6 elevatably mounted at the front side of the front frame 3.

The front axle 4 is housed inside left and right axle sleeve members 4A, which rotatably support the front axle 4 and are locked to a lower surface of the front frame 3. This means that the front axle 4 is mounted on the lower surface of the front frame 3 in a state in which it is not allowed to engage in a rolling motion around a roll axis O. In addition, the hybrid wheel loader 1 adopts a structure whereby a large load applied to the work device 6 is borne by the front frame 3, the front axle 4, the front wheels 5 and the like without any suspension device or the like disposed for buffering purposes between the front axle 4 and the front frame 3.

The work device 6 includes arms 6A mounted at bracket portions 3A disposed at the upper ends on the two sides, i.e., the left side and the right side, of the front frame 3 so as to be allowed to move up/down and a bucket 6B rotatably mounted at the front ends of the arms 6A. The arms 6A are rotationally driven via arm cylinders 6C, whereas the bucket 6B is rotationally driven via a bucket cylinder 6D. As the arm cylinders 6C and the bucket cylinder 6D in the work device 6 are engaged in rotating operation, the bucket 6B is made to move up/down, and soil or the like carried in the bucket 6B can be thus loaded into a dump truck or the like. As will be described in detail later, a rotational angle detector 84 is disposed at the rotational fulcrum point of each arm 6A so as to detect the rotational angle of the arm 6A, whereas a rotational angle detector 85 is disposed at the rotational fulcrum point of the bucket 6B so as to detect the rotational angle of the bucket 6B. Based upon an arithmetic operation executed based upon the detection results, the height of the bucket 6B can be determined.

The rear body 7, located further rearward relative to the front body 2, is linked in a state in which it can articulate left and right. The rear body 7 includes a rear frame 9 where a drive source 8 is housed, a rear axle 10 disposed on the lower side of the rear frame 9, rear wheels 11 disposed at the left and right ends of the rear axle and an operator's cab 12 disposed atop the rear frame 9.

The rear frame 9 is configured with a housing frame portion 9A (see FIG. 2) where the drive source 8, constituted with an engine, a hydraulic pump, a hydraulic motor and the like is housed, and a joining portion 9B disposed to the front of the housing frame portion 9A.

A pair of support brackets 13, ranging along the length of the body, are disposed on the lower side of the housing frame portion 9A. The pair of support brackets 13 are disposed in a middle area of the rear frame 9 along the lengthwise direction at positions set apart from each other. The central axis, running through the center of the body assumed along the widthwise direction, is referred to as a roll axis O passing through the front frame 3 and the rear frame 9 along the full length of the body. A through hole (not shown) is formed so as to pass through each support brackets 13 along the roll axis O. A support portion 14 (see FIG. 3) for the rear axle 10 is disposed between the pair of support brackets 13.

Axle sleeve members 10A housing the rear axle 10 are fixed to the two sides of the support portion 14, i.e., to the left side and the right side of the support portion 14, and support shafts 14A project out along the roll axis O on the front side and the rear side of the support portion 14. The support shafts 14A of the support portion 14 pass through the through holes (not shown) in the support brackets 13. Thus, the rear axle 10 is axially supported at the rear frame 9 so as to be allowed to rotate around the roll axis O. In addition, the rear axle 10 and the front axle 4 are linked with the drive source 8 via a propeller shaft 15. As a result, a drive force imparted from the drive source 8 is transmitted via the propeller shaft 15 to the front wheels 5 and the rear wheels 11 so as to achieve four-wheel drive.

The joining portion 9B includes a cylindrical joint tube portion 16 extending along the roll axis O, with a joint shaft 20 and a bearing (not shown) axially supporting the joint shaft 20 both housed inside the joint tube portion 16. In addition, the operator's cab 12, to be occupied by an operator, is positioned above the joining portion 9B.

The joining frame 181 is located between the front frame 3 and the rear frame 9. At the joining frame 181, a link pin (not shown) extending along the vertical direction (along the pivot axis Z in FIG. 3) toward the upper and lower ends of the joining frame 181, is disposed at a position halfway between the left and right ends of the joining frame 181. In addition, the joint shaft 20 assuming a cylindrical shape is disposed at the joining frame 181 so as to extend along the roll axis O toward the rear frame 9. The propeller shaft 15, which links the front axle 4 with the drive source 8, is inserted through the joint shaft 20.

The joining frame 181, held between an upper plate 3B and a lower plate 3C (see FIG. 3) of the front frame 3, is linked to the front frame 3 via the link pin and is also linked to the rear frame 9 with the joint shaft 20 inserted through the joint tube portion 16 of the joining portion 9B.

As a result, the front frame 3 and the rear frame 9 are linked via the joining frame 181 so that they are allowed to articulate to the left and to the right in FIG. 2, around the pivot axis Z (the central axis of the link pin). In addition, the joint shaft 20 at the joining frame 181 is axially supported by a bearing (not shown) so as to be allowed to rotate around the roll axis O. In short, the joining frame 181 links the front frame 3 and the rear frame 9 so that the front frame 3 and the rear frame 9 are allowed to roll relative to each other.

A joining bracket 21 is disposed on the front side of the joining frame 181, with one end of a steering cylinder 22 mounted at the joining bracket 21. Another end of the steering cylinder 22 is attached to the lower plate 3C of the front frame 3. The steering cylinder 22, which extends/contracts as pressure oil from the hydraulic pump (not shown) in the drive source 8 is supplied thereto and the pressure oil is discharged therefrom, causes the front frame 3 to articulate to the left/right relative to the rear frame 9.

The hybrid wheel loader 1 in the embodiment is engaged in traveling operation by driving the hydraulic motor (not shown) in the drive source 8 linked to the front axle 4 and the rear axle 10 via the propeller shaft 15. As the hydraulic motor is driven, the front wheels 5 and the rear wheels 11 are rotationally driven via the front axle 4 and the rear axle 10, causing the wheel loader 1 to move forward/backward. In addition, as the steering cylinder 22 is made to extend/contract via the hydraulic pump (not shown) in the drive source 8, the front frame 3 and the rear frame 9 are made to articulate to the left/right around the pivot axis Z so as to turn the hybrid wheel loader 1 to the left/right. When excavating soil or the like, the arm cylinders 6C and the bucket cylinder 6D are caused to extend/contract via the hydraulic pump (not shown) in the drive source 8 in order to move the bucket 6B up/down. The excavating operation is performed by moving the wheel loader 1 forward/backward in this state. It is to be noted that as described in detail later, an electric motor is engaged in operation as necessary so as to assist in the traveling operation and the excavating operation of the hybrid wheel loader 1.

Hydraulic cylinders 23 in the hybrid wheel loader 1 are actuators for suppressing rolling vibration disposed between the rear frame 9 and the rear axle 10. The hydraulic cylinders 23, one disposed near the left-side rear wheel 11 and another disposed near the right-side rear wheel 11, extend along the top/bottom direction. The hydraulic cylinders 23 are each mounted with the bottom side of its tube attached to the rear frame 9 and the front end of its rod attached to an axle sleeve member 10A housing the rear axle 10. The hydraulic cylinders 23 are connected to the hydraulic pump (not shown) in the drive source 8. The left hydraulic cylinder 23 and the right hydraulic cylinder 23 each apply a thrust force $F_0$, imparted around the roll axis O, to an area between the rear frame 9 and the rear axle 10, in correspondence to the pressure difference between the bottom side and the rod side. The rolling vibration (vibration occurring around the roll axis O) of the rear frame 9 can be thus suppressed via the hydraulic cylinders 23.

The front frame 3 and the rear frame 9 of the hybrid wheel loader in the embodiment are linked via the joining portion 9B and the joining frame 181 so as to be allowed to roll relative to each other around the roll axis O. This means that even as the front frame 3 vibrates around the roll axis O while the work device 6 is engaged in excavating operation or the like, the rear frame 9 can be caused to roll relative to the front frame 3 via the joining frame 181 and the like. As a result, transmission of vibration in the front frame 3 to the rear frame 9 can be prevented. In addition, with the hydraulic cylinders 23 disposed between the rear frame 9 and the rear axle 10, the thrust force F, imparted around the roll axis O, is applied to the area between the rear frame 9 and the rear axle 10 so as to suppress rolling vibration of the rear frame 9. Consequently, the comfort of the ride in the operator's cab 12 disposed on the rear frame 9 can be improved.

A traveling dynamo-electric motor (traveling motor) 25 is mounted on the axis of the propeller shaft 15 within the front frame 3 (see FIGS. 2 and 3). The rotational axis of the traveling dynamo-electric motor 25 is coaxial with the rotational axis of the propeller shaft 15. As described in detail later, the traveling dynamo-electric motor 25 is engaged in operation as power is supplied thereto from an electricity storage device so as to assist the engine when sufficient tractive force cannot be provided by the engine alone.

The drive source 8 includes an engine 50, with a motor/generator 30 disposed on the output side of the engine 50. The motor/generator 30 also fulfills a power generating function. A transmission 40 is disposed on the output side of the motor/generator 30. As described in detail later, an input shaft of the transmission 40 is directly linked to the drive shaft of the engine 50, whereas its output shaft is configured as an integrated part of the propeller shaft 15.

FIG. 4 is an enlarged sectional view of an area A enclosed by the two-point chain line in FIG. 2, i.e., structural details pertaining to the area between the engine 50 and the transmission 40. A plurality of mounting holes 51a are formed at an end surface of a drive shaft 51 of the engine 50. The motor/generator 30 is disposed by a side surface of the engine 50. The motor/generator 30 includes a rotating shaft 31, a rotor 32 disposed at the rotating shaft 31 and a stator 33 disposed around the outer edge of the rotor 32. The rotating shaft 31 at the motor/generator 30 assumes a hollow cylindrical form with a solid bottom portion 31a located on the side facing opposite the bottom surface of the drive shaft 51 of the engine 50 and an open top achieved by forming an opening at an end surface 31b located on the side opposite from the bottom portion 31a. Through holes 31c are formed at the bottom portion 31a of the rotating shaft 31 of the motor/generator 30, at positions corresponding to the positions of the mounting holes 51a formed at the end surface of the drive shaft 51. The rotating shaft 31 is directly linked to the drive shaft 51 of the engine 50 via fastening means 61, such as bolts, inserted through the through holes 31c and fastened at the mounting holes 51a.

The rotor 32 is disposed along the outer circumference of the rotating shaft 31. One end surface 32a of the rotor 32, located toward the engine 50, is substantially flush with the outer surface of the bottom portion 31a of the rotating shaft 31. Another end surface 32b of the rotor 32 is located at a middle position along the length of the rotating shaft 31. A side bearing 34 is disposed at the outer circumference of the rotating shaft 31 between the other end surface 32b of the rotor 32 and the other end surface 31b of the rotating shaft 31.

The axial center of the rotating shaft 31 of the motor/generator 30 in alignment with the axial center of the drive shaft 51 of the engine 50, and thus, the rotating shaft 31 rotates on the axial center of the drive shaft 51 as the drive shaft 51 of the engine 50 rotates. The side bearing 34, disposed in an area between the transmission 40 and the side surfaces of the rotor 32 and the stator 33, supports the rotor 32 and the stator 33 at their side surfaces as the rotating shaft 31 rotates.

Reference numeral 62 indicates a flywheel case, whereas reference numeral 63 indicates a torque converter case. The flywheel case 62 and the torque converter case 63, with side edges thereof partially polymerized with each other, are joined together via a fastening means 64 such as bolts. The flywheel case 62 and the torque converter case 63 are connected to the stator 33. The stator 33 is placed and installed in the flywheel case 62 and the torque converter case 63 holding the side bearing 34 therein. The structural rationale for configuring the casing for the motor/generator 30 with two cases, i.e., the flywheel case 62 and the torque converter case 63, will be described later in reference to FIG. 5.

The transmission 40 is disposed on the side of the motor/generator 30 opposite from the side where the engine 50 is present. The transmission 40 includes a transmission bearing 41, a pump gear 42, a transmission rotating shaft 43, a gear train set over a plurality of stages and an output shaft (the last two members not shown). The transmission bearing 41 is in contact with the other end surface 31b of the rotating shaft 31 of the motor/generator 30. The pump gear 42 in the transmission 40 is linked through a spline to the rotating shaft 31 of the motor/generator 30 and the axial center of the pump gear 42 is in alignment with that of the rotating shaft 31 of the motor/generator 30. This means that as the drive shaft 51 of the engine 50 rotates, the rotating shaft 31 of the motor/generator 30 and the pump gear 42 of the transmission 40, too, rotate as one. The rotation of the pump gear 42 is transmitted to the transmission rotating shaft 43. Namely, the pump gear 42 and the transmission rotating shaft 43 work as an input shaft of the transmission 40.

The output shaft (not shown) of the transmission 40 is directly linked to the propeller shaft 15, as shown in FIG. 3. Thus, the rotation of the drive shaft 51 of the engine 50 is transmitted to the propeller shaft 15 via the gear train assuming a selected gear setting within the transmission 40. The transmission 40 is housed inside a transmission case 65. The transmission case 65 and the torque converter case 63, with side edges thereof partially polymerized with each other, are joined together via a fastening means 66 such as bolts.

Figure 5:
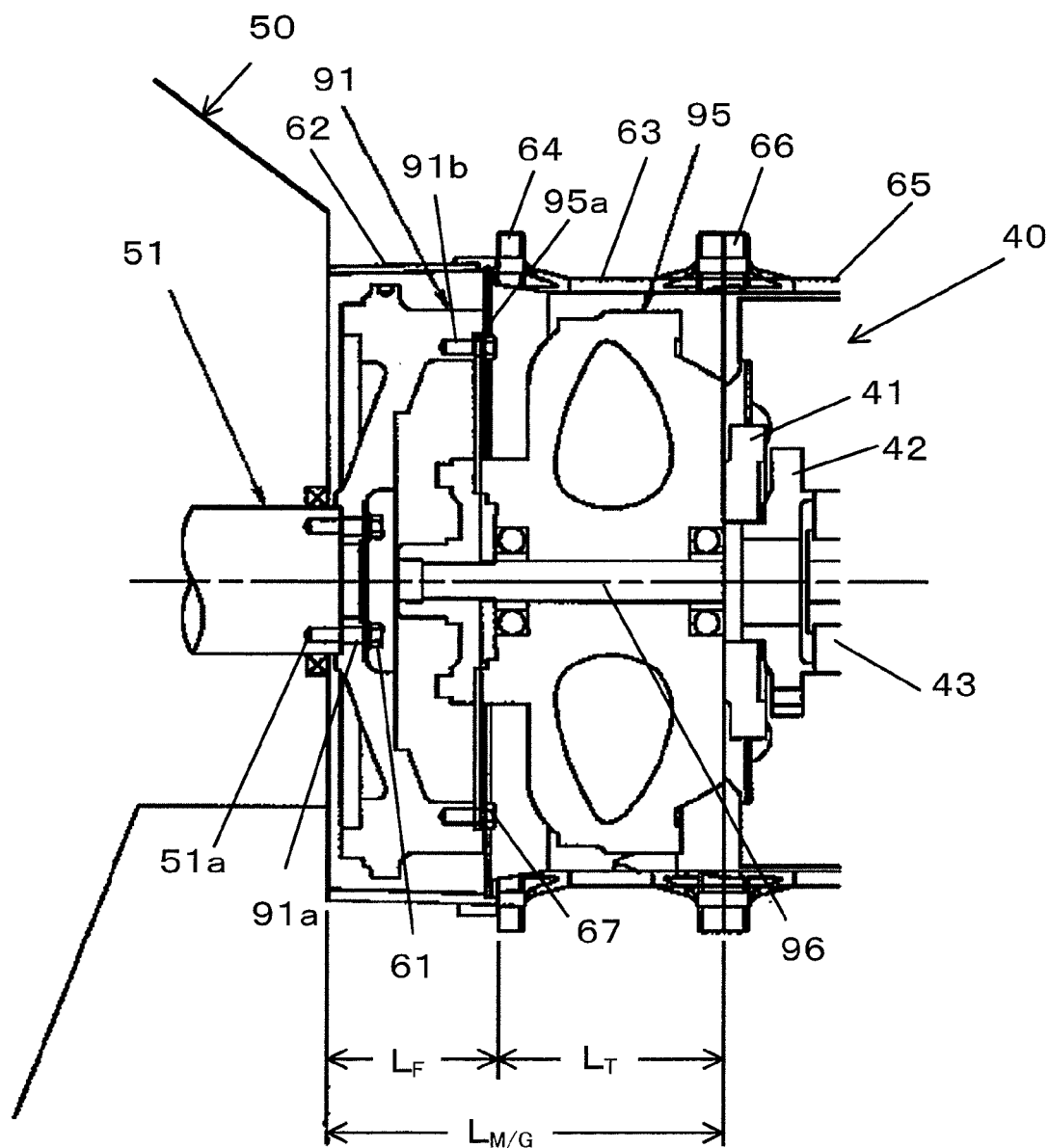

The motor/generator 30 shown in FIG. 4 may be replaced with a flywheel and a torque converter, as shown in FIG. 5. Namely, a given type of hybrid wheel loader may be engaged in operation in conformance to motor/generator specifications or in conformance to torque converter specifications. This structural feature, which will be explained in detail later, is achieved by configuring the casing for the motor/generator 30 with two cases, i.e., the flywheel case 62 and the torque converter case 63.

Figure 7:
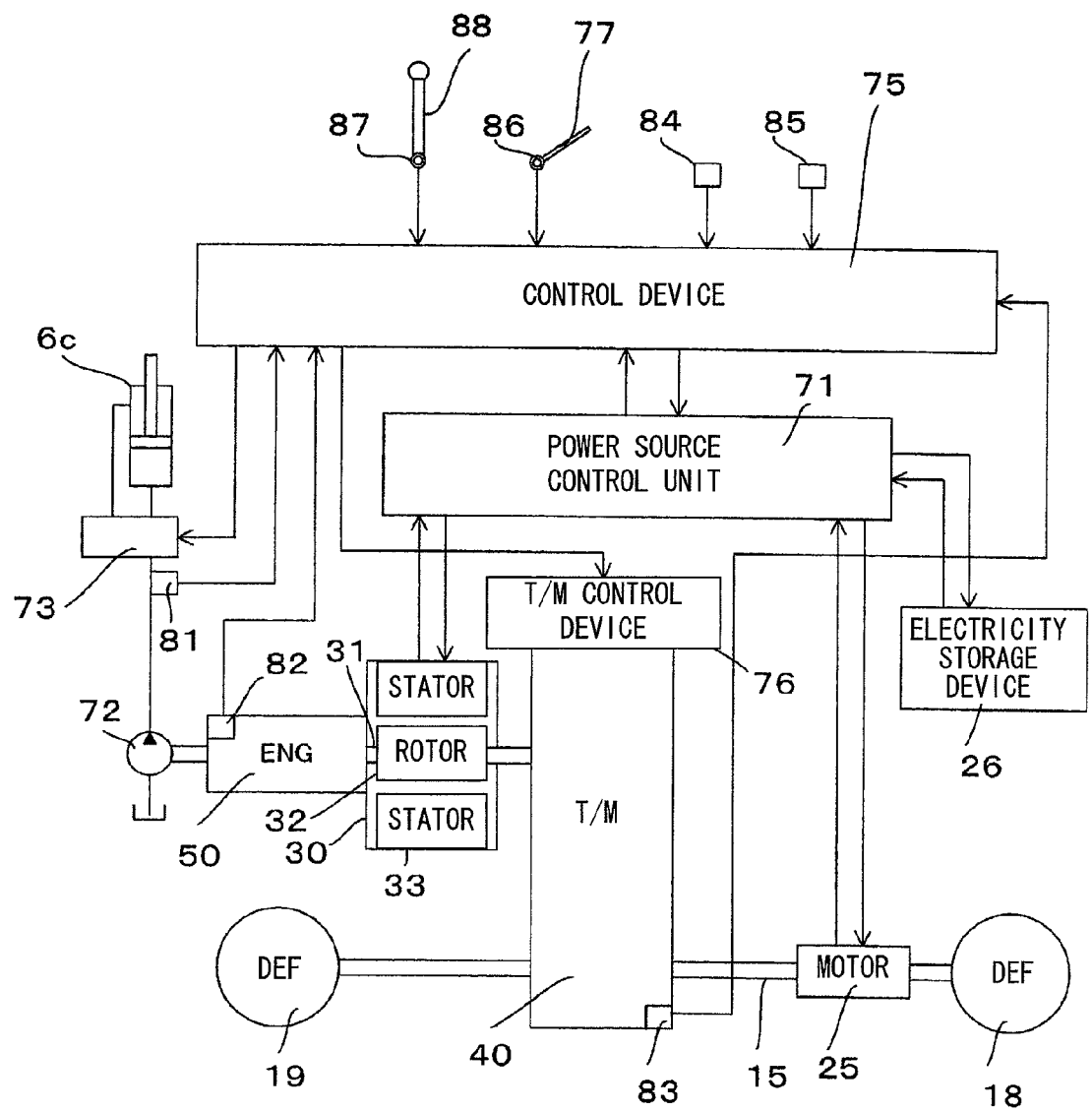

FIG. 7 is a system block diagram that may be applicable to the hybrid wheel loader according to the present invention.

As explained earlier, the rotating shaft 31 of the motor/generator 30 is directly linked to the drive shaft 51 of the engine 50. The motor/generator 30 includes the rotor 32 attached to the rotating shaft 31 and the stator 33 disposed around the outer circumference of the rotor 32. The input shaft of the transmission 40 is joined through a spline with the rotating shaft 31 of the motor/generator 30. The output shaft (not shown) of the transmission 40 constitutes an integrated part of the propeller shaft 15.

The driving dynamo-electric motor 25 is mounted on the axis of the propeller shaft 15. A differential gear unit 18 is located between the propeller shaft 15 and a central point taken along the length of the front axle 4. A differential gear unit 19 is located between the propeller shaft 15 and a central point taken along the length of the rear axle 10.

As described earlier, the traveling dynamo-electric motor 25 is disposed within the front frame 3. The positional arrangement in which the traveling dynamo-electric motor 25 is mounted on the axis of the propeller shaft 15 is one of the structural features characterizing the embodiment of the hybrid wheel loader 1 according to the present invention. The space inside the front frame 3 of a wheel loader is normally empty space where no hydraulic pump, hydraulic motor, actuator such as a dynamo-electric motor or attachment is disposed. This means that the traveling dynamo-electric motor 25 can be housed within the front frame 3 without having to increase the bulk of the hybrid wheel loader 1. An additional advantage can be achieved by housing the traveling dynamo-electric motor within in the front frame 3, in that a high level of safety is assured through a simple structure, since the traveling dynamo-electric motor 25 will be protected by the front frame 3 against any falling object such as soil, during work or the like.

The hybrid wheel loader 1 is equipped with an electricity storage device 26. As the driver takes his foot off the accelerator pedal while the hybrid wheel loader 1 travels with the motor/generator 3 operating as a motor, regenerative braking is applied, thereby decreasing the rotation rate of the front wheels 5 and the rear wheels 11. As the decrease in the rotation rate at the front wheels 5 and the rear wheels 11 is detected via a vehicle speed detector 83, to be described in detail later, a control device 75 switches the motor/generator 30 to generator operation and executes control so as to charge the electricity storage device 26 with electrical energy generated by the motor/generator 30. The control device 75 executes similar control for the traveling dynamo-electric motor 25 so as to charge the electricity storage device 26 with regenerative energy generated via the traveling dynamo-electric motor 25 while regenerative braking is applied.

A power source control unit 71, which includes an inverter circuit, executes control so that the electrical energy generated when the motor/generator 30 is driven with the engine 50 and operates as a generator, is charged into the electricity storage device 26. The power source control unit 71 also executes control to ensure that electrical energy having accumulated in the motor/generator 30 and the traveling dynamo-electric motor 25 is charged into the electricity storage device 26. The power source control unit 71 further includes a charge quantity detection circuit that detects the quantity of electricity charged in the electricity storage device 26.

As FIG. 7 clearly indicates, the motor/generator 30 is linked to the propeller shaft 15 via the transmission 40 alone. In other words, the motor/generator 30 is not linked to the propeller shaft 15 via a torque converter. This means that as the hybrid wheel loader 1 travels on the front wheels 5 and the rear wheels 11 driven via the propeller shaft 15 and the differential gear units 18 and 19, electrical energy generated via the motor/generator 30 when the hybrid wheel loader 1 decelerates with regenerative braking, can be employed with a higher degree of efficiency.

In addition, the traveling dynamo-electric motor 25 is directly mounted on the axis of the propeller shaft 15 with no gear train present between the traveling dynamo-electric motor 25 and the propeller shaft 15. Thus, electrical energy obtained by generating power at the traveling dynamo-electric motor 25, to which the drive force imparted from the front wheels 5 and the rear wheels 11 is transmitted via the propeller shaft 15 and the differential gear units 18 and 19 can be employed with a higher level of efficiency.

The rotating shafts of hydraulic pumps 72 are linked to the drive shaft 51 of the engine 50. Oil output from the hydraulic pumps 72 is supplied via control valves 73 to the arm cylinders 6C and the bucket cylinder 6D. It is to be noted that FIG. 7 does not include an illustration of the bucket cylinder 6D or the hydraulic pump and the control valve for the bucket. The control valves 73 are each switched via a pilot valve (not shown) that is controlled by an electromagnetic valve (not shown) connected to the control device 75.

The control device 75 is constituted with a CPU, a ROM, a RAM and an arithmetic processing unit. A pressure "p" on the bottom side of each pressure pump 72 is detected by a pressure detectors 81 connected to the control device 75. An engine rotation rate detector 82 is installed at the engine 50 so as to provide engine rotation rate information to the control device 75. The vehicle speed detector 83, which detects the vehicle speed, is mounted on the output side of the transmission 40. A transmission control device 76, which includes a solenoid valve, supplies a clutch pressure, used to automatically select a specific gear setting in correspondence to the vehicle speed, to the transmission 40. The vehicle speed detector 83 and the transmission control device 76 are connected to the control device 75.

An operational angle detector 87 that detects the extent to which an operation lever 77, disposed in the operator's cab 12 (see FIG. 1), is operated is connected to the control device 75. In addition, an accelerator operation degree detector 86, the rotational angle detectors 84 and the rotational angle detector 85 are connected to the control device 75. The accelerator operation degree detector 86 detects the extent to which the accelerator pedal 77 is operated. The rotational angle detectors 84, each disposed at the rotational fulcrum point of the arm 6A, detect the rotational angle assumed by the arms 6A. The rotational angle detector 85, disposed at the rotational fulcrum point of the bucket 6B, detects the rotational angle assumed by the bucket 6B.

Figure 8:
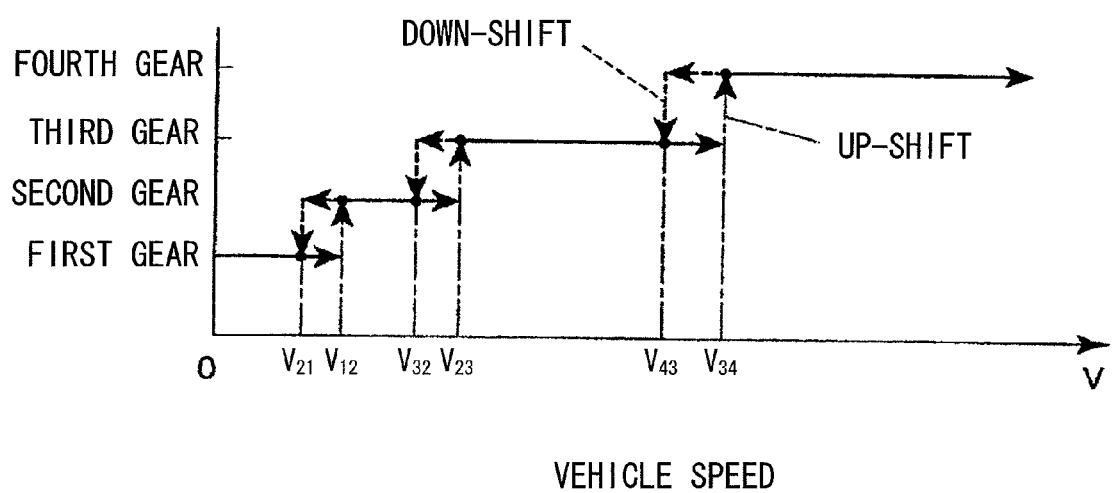

FIG. 8 indicates the relationship between the vehicle speed "v" and the gear settings. The control device 75 outputs a control signal, generated in correspondence to the vehicle speed "v", to the transmission control device 76, which, in turn, adjusts the gear setting at the transmission 40 in correspondence to the vehicle speed "v", as indicated in FIG. 8. Namely, once the vehicle speed "v" rises to a shift-allowing vehicle speed v12, the transmission control device 76 up-shifts from first gear to second gear. Then, as the vehicle speed "v" rises from the shift-allowing vehicle speed v12 to a shift-allowing vehicle speed v23, the gear setting is shifted from second gear to third gear, and as the vehicle speed "v" rises from the shift-allowing vehicle speed v23 to a shift-allowing vehicle speed v34, the gear setting is shifted from third gear to fourth gear. In addition, as the vehicle speed "v" falls to a shift-allowing vehicle speed v43, the transmission control device 76 shifts from fourth gear to third gear. As the vehicle speed "v" falls to a shift-allowing vehicle speed v32, the gear setting is shifted down from third gear to second gear and as the vehicle speed "v" falls to a shift-allowing vehicle speed v21, the gear setting is shifted down from second gear to first gear.

It is to be noted that the shift-allowing vehicle speeds v12, v23 and v34 are set respectively higher than the shift-allowing vehicle speeds v21, v32 and v43, so as to assure stable shift changes. These shift-allowing vehicle speeds, each used as a threshold value for allowing up-shifts and down-shifts, are set in advance in the control device 75. The transmission control device 76, which includes the solenoid valve via which the gear setting is switched, is driven in response to a control signal provided by the control device 75. While a specific gear setting among the first through fourth gear settings is selected through the automatic gear shift in the example presented in FIG. 8, first gear may be selected manually with a gear setting in the second to fourth gear range selected through automatic gear shifting instead.

Figure 9:
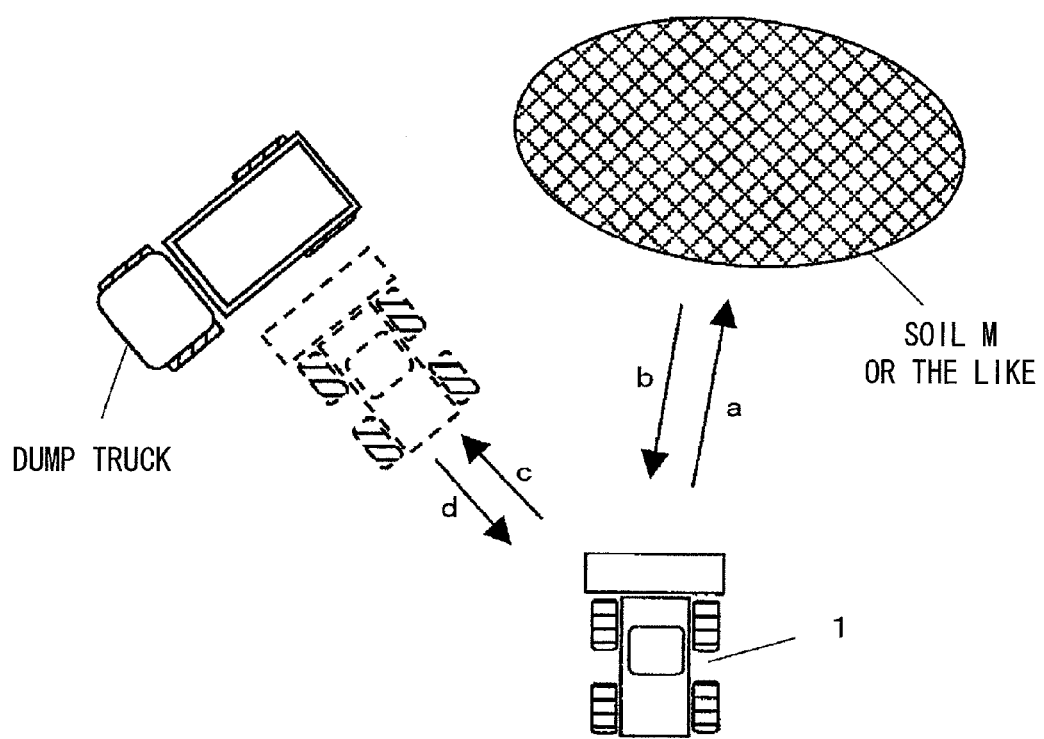

FIG. 9 illustrates a V-pattern loading operation, through which soil M or the like may be loaded by the hybrid wheel loader 1 into a dump truck. The hybrid wheel loader 1 engaged in the V-pattern loading operation advances as indicated by an arrow "a" in order to scoop up the soil M or the like. Subsequently, the hybrid wheel loader 1 retreats as indicated by an arrow "b". Then, the hybrid wheel loader 1 advances toward the dump truck as indicated by an arrow "c" in order to load the soil M or the like having been scooped up into the dump truck. Finally, the hybrid wheel loader 1 retreats to the initial position, as indicated by an arrow "d".

Figure 10:
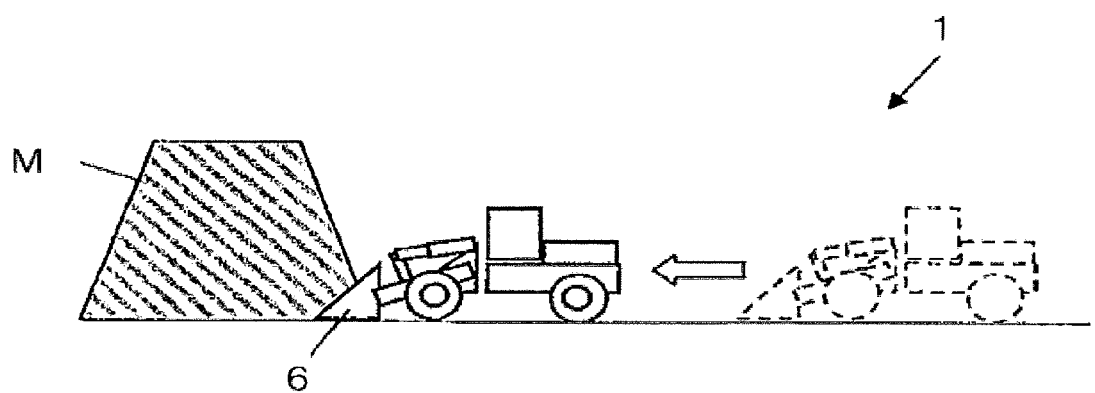

FIG. 10 is a sectional view of the scooping step through which the hybrid wheel loader 1 advances as indicated by the arrow "a" and scoops up the soil M or the like during the V-pattern loading operation shown in FIG. 9.

The following is a detailed description of an example of processing that may be executed for the scooping step.

Figure 11:
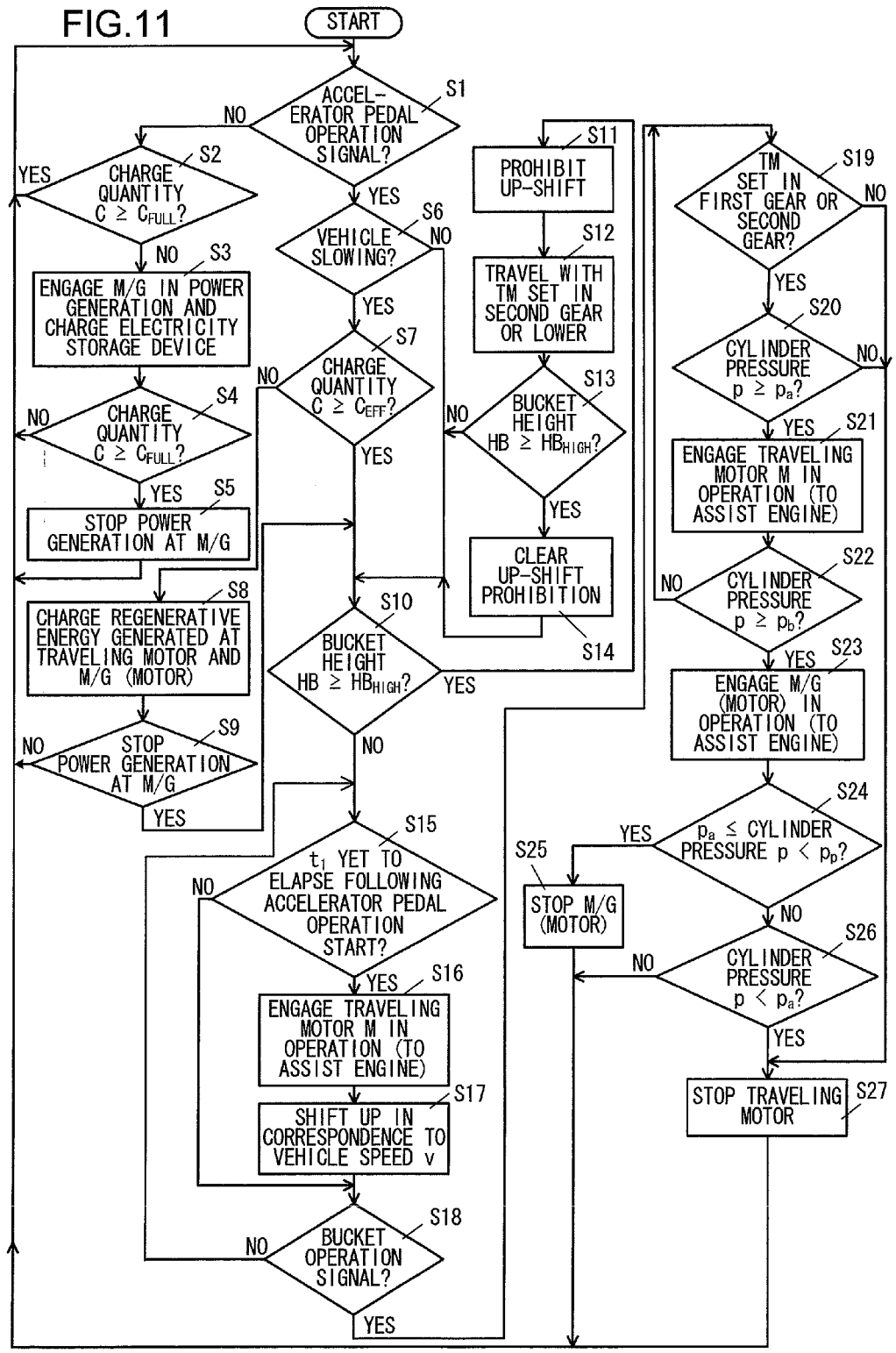

FIG. 11 presents a flowchart of the processing executed in the hybrid wheel loader 1.

At the start of the processing, the engine 50 is already running and thus, the drive shaft 51 of the engine is rotating.

In this state, the control device 75 makes a decision in step S1 as to whether or not the accelerator pedal 77 (see FIG. 7) is being operated. If the driver's foot is off the accelerator pedal, the power source control unit 71 makes a decision as to whether or not the charge quantity C, indicating the extent to which the electricity storage device 26 is charged, is equal to a level $C_{FULL}$ (step S2). If the charge quantity C is not equal to $C_{FULL}$, the power source control unit 71 charges the electricity storage device 26 with electrical energy generated at the motor/generator 30 (step S3). The power source control unit 71, which includes an inverter, as described earlier, converts AC current generated through power generation executed at the motor/generator 30 to DC current via the inverter and charges the electricity storage device 26 with the DC current resulting from the conversion.

Following the charge start, the charge quantity detection circuit in the power source control unit 71 measures the charge quantity C, over predetermined time intervals and a decision is made as to whether or not the charge quantity C has become equal to $C_{FULL}$ (step S4). Once the charge quantity C becomes equal to $C_{FULL}$, the power source control unit 71 stops the power generation at the motor/generator 30 (step S5). If the charge quantity is yet to match $C_{FULL}$, the operation returns to step S1.

If it has been decided in step S2 that the charge quantity C at the electricity storage device 26 has become equal to $C_{FULL}$ and if it has been decided in step S10 that the charge quantity C at the electricity storage device 26 has become equal to $C_{FULL}$, the operation will return to step S1 to wait in standby for an accelerator pedal operation signal.

As an accelerator operation signal is output from the accelerator pedal operation degree detector 86 and the accelerator pedal 77 is thus judged to be currently operated, the rotation of the drive shaft 51 of the engine 50 is transmitted to the front wheels 5 and the rear wheels 11 via the transmission 40 and the propeller shaft 15, thereby engaging the hybrid wheel loader 1 in traveling operation. Then, in step S6, the control device 75 makes a decision as to whether or not the vehicle speed has decreased. Vehicle speed information is transmitted to the control device 75 from the vehicle speed detector 83 (see FIG. 7) mounted on the output side of the transmission 40.

The control device 75 compares the current vehicle speed with a previous vehicle speed and determines whether or not the vehicle speed has decreased. If it is decided that the vehicle speed has decreased, the power source control unit 71 institutes regenerative braking. Namely, the power source control unit 71 makes a decision in step S7 as to whether or not the electricity storage device 26 has been charged to a charge quantity C equal to $C_{FULL}$. If it is decided in step S7 that the electricity storage device 26 has not been charged to $C_{FULL}$, the power source control unit 71 charges the electricity storage device 26 (step S8) by regenerating electrical energy obtained under power generation control executed with the traveling dynamo-electric motor 25 and the motor/generator 30 set in the power generation mode.

Following the charge start at the electricity storage device 26, the charge quantity detection circuit in the power source control unit 71 measures the charge quantity C at the electricity storage device 26 over predetermined time intervals and a decision is made as to whether or not the charge quantity C has become equal to a predetermined charge quantity $C_{Eff}$ (step S9). If it is decided in step S9 that the charge quantity C at the electricity storage device 26 has not become equal to the predetermined charge quantity $C_{Eff}$, the operation returns to step S8 so as to allow the power source control unit 71 to continuously regenerate the electrical energy provided by the traveling dynamo-electric motor 25 and the motor/generator 30.

The predetermined charge quantity $C_{Eff}$ assumes a value smaller than the value of $C_{FULL}$. Even when the charge quantity C indicating the extent to which the electricity storage device 26 is charged is less than $C_{FULL}$, the power source control unit 71 is able to engage the traveling dynamo-electric motor 25 or the motor/generator 30 in operation. The predetermined charge quantity $C_{Eff}$ is a charge quantity limit at which the traveling dynamo-electric motor 25 or the motor/generator 30 can be engaged in operation, and is set in advance at the control device 75.

If it is decided in step S7 that the charge quantity C at the electricity storage device 26 has reached $C_{FULL}$, or if it is decided in step S9 that the electricity storage device 26 has been charged to achieve a charge quantity C equal to the predetermined charge quantity $C_{Eff}$, the control device 75 executes the processing in step S10.

In step S10, the control device 75 makes a decision as to whether or not a height HB of the bucket 6B is equal to or greater than a predetermined height $HB_{high}$. The height HB of the bucket 6B can be determined by the control device 75 through arithmetic operation executed based upon the output signals provided from the rotational angle detectors 84 for the arms 6A and the rotational angle detector 85 for the bucket 6B.

If it is decided in step S 10 that the bucket height HB is equal to or greater than the predetermined height $HB_{high}$, the control device 75 provides an up-shift prohibit signal to the transmission control device 76, which then disallows automatic gear shift at the transmission (step S11). As explained earlier, an automatic up-shift is executed in the range of the first gear through fourth gear or from second gear through fourth gear, in correspondence to the vehicle speed indicated in the output signal provided from the vehicle speed detector 83. This automatic gear shift is prohibited by the transmission control device 76 when the height HB is judged equal to or greater than the predetermined height $HB_{high}$. The hybrid wheel loader 1 is thus made to travel at low speed, i.e., at a speed equal to or less than the limit of second gear (step S12). While the hybrid wheel loader 1 travels at low speed, the control device 75 monitors the height information indicating the height of the bucket 6B and, as long as the height HB of the bucket 6B is determined to be equal to or greater than the predetermined height $HB_{high}$, in step S13, the operation returns to step S10 to limit the speed of the hybrid wheel loader 1 to a speed equal to or less than the limit of second gear. Once it is decided by the control device 75 in step S13 that the bucket height HB has become equal to or less than the predetermined height $HB_{high}$, the up-shift prohibition is cleared (step S14) before the operation returns to the processing in step S10. The processing in steps S11 through S14 is executed to prevent the hybrid wheel loader 1 from tipping over, since the hybrid wheel loader 1 traveling at high speed while holding the bucket 6B at a high position is more likely to tip.

If the control device 75 decides in step S10 that the height HB of the bucket 6B is not equal to or greater than the predetermined height $HB_{high}$, the control device 75 makes a decision in step S15 as to whether or not a predetermined length of time $t_1$ is yet to elapse following the start of the operation at the accelerator pedal 77. If it is decided that the predetermined length of time $t_1$ is yet to elapse, the power source control unit 71 engages the traveling dynamo-electric motor 25 in operation (step S16). Namely, the control device 75 issues a command for the power source control unit 71 so as to engage the traveling dynamo-electric motor 25 in operation, and in response, the power source control unit 71 drives the traveling dynamo-electric motor 25 by providing electric power from the electricity storage device 26 to the traveling dynamo-electric motor 25. The DC electric current output from the electricity storage device 26 in this situation is converted to an AC current via the inverter in the power source control unit 71.

Once the traveling dynamo-electric motor 25 is engaged in operation, the torque of the traveling dynamo-electric motor 25 is added to the propeller shaft 15, resulting in an increase in the tractive force of the hybrid wheel loader 1, which, in turn, quickly raises the vehicle speed. In other words, if an affirmative decision (yes) is made in step S15, the traveling dynamo-electric motor 25 is engaged in operation to assist the engine 50 (step S16). A rotation rate corresponding to the extent to which the accelerator pedal 77 is operated, is then achieved at the drive shaft 51 of the engine 50. As a result, an up-shift corresponding to the current vehicle speed "v" is executed in step S17, as has been described in reference to FIG. 8.

When the hybrid wheel loader 1 is at a position away from the soil M or the like to be scooped, as indicated by the dotted lines in FIG. 10, better work efficiency is achieved by enabling the hybrid wheel loader 1 to accelerator quickly to move toward the soil M or the like. The processing executed in steps S15 through S17 corresponds to this particular work phase. However, if the traveling dynamo-electric motor 25 is always engaged in operation to assist the engine 50, the hybrid wheel loader 1 may pick up speed even when it is not necessary to lead to operational problems. Furthermore, under such circumstances, power will be used up wastefully, which will be undesirable from an ecological viewpoint. Accordingly, the traveling dynamo-electric motor 25 in the hybrid wheel loader 1 according to the present invention is engaged in operation in order to assist the engine 50 only within a period lasting the predetermined time length $t_1$ after the accelerator pedal 77 is operated.

If the control device 75 decides in step S15 that a length of time exceeding the predetermined time length $t_1$ has elapsed following the start of operation of the accelerator pedal 77, the operation directly proceeds to step S18 without executing an up-shift via the transmission control device 76. In step S18, the control device 75 makes a decision as to whether or not an operation signal indicating an operation of the operation lever 88 has been provided by the operational angle detector 87 (FIG. 7). If an operation signal indicating that the bucket 6B has been operated has not been output, the operation returns to step S15. After returning to step S15, if it is decided again that the predetermined length of time $t_1$ is yet to elapse following the start of the operation of the accelerator pedal 77, the power source control unit 71 continuously allows the hybrid wheel loader 1 to travel at high speed by keeping the traveling dynamo-electric motor 25 engaged in operation.

If it is decided in step S18 that a bucket operation signal has been output to the control device 75, a decision is made in step S19 by the transmission control device 76 as to whether or not the transmission 40 is currently set in first gear or second gear. If it is decided that the transmission 40 is set in first gear or second gear, the control device 75 executes the processing in step S20. Otherwise the power source control unit 71 executes the processing in step S27. In step S20, the control device 75 makes a decision as to whether or not the pressure "p" at the hydraulic cylinders 6c is greater than a first pressure $P_a$. If it is decided in step S20 that the pressure "p" at the hydraulic cylinders 6c is greater than the first pressure $P_a$, the power source control unit 71 drives the traveling dynamo-electric motor 25 (step S21). As a result, the tractive force imparted by the engine 50 is assisted by the traveling dynamo-electric motor 25 so as to distribute the force of engine power to the hydraulic system.

Next, the control device 75 makes a decision in step S22 as to whether or not the pressure "p" at the hydraulic cylinders 6c is greater than a second pressure $P_b$. The second pressure $P_b$ is represented by a value greater than that representing the first pressure $P_a$. If it is decided in step S22 that the pressure "p" at the hydraulic cylinders 6c is greater than the second pressure $P_b$, the power source control unit 71 drives the motor/generator 30 as a motor in step S23. The traveling dynamo-electric motor 25 and the motor/generator 30 are both driven by providing electric power from the electricity storage device 26 to the traveling dynamo-electric motor 25 and/or the motor/generator 30 under control executed by the power source control unit 71 in response to a command issued by the control device 75. If it is decided in step S20 that the pressure "p" at the hydraulic cylinders 6c is not greater than the first pressure $P_a$, the power source control unit 71 executes the processing in step S27. In addition, if it is decided in step S22 that the pressure "p" at the hydraulic cylinders 6c is not greater than the second pressure $P_b$, the operation returns to step S19 to repeatedly execute the processing in steps S19 through S22.

The processing executed in step S19 through step S23 is now explained in relation to the work performed by the hybrid wheel loader 1.

As the hybrid wheel loader 1 moves toward the soil M or the like to start an excavating operation, as shown in FIG. 10, the vehicle speed is lowered to first gear or second gear and the bucket 6B is maneuvered via the operation lever 88. Accordingly, the transmission 40 is determined to be set at first gear or second gear in step S19. The excavating operation may be executed without lowering the vehicle speed if the soil M or the like is light.

If the soil M or the like is heavy, the pressure "p" on the bottom side of the hydraulic cylinders 6c will be high. Information indicating the pressure "p" at the hydraulic cylinders 6c is transmitted from the pressure detectors 81 to the control device 75. A value representing the pressure "p", which corresponds to the weight of the soil M or the like, that can be handled with the tractive force imparted by the engine 50 is set in advance as the first pressure $P_a$ in a storage unit of the control device 75. If the pressure "p" indicated in the information transmitted from the pressure detectors 81 is equal to or greater than the first pressure $P_a$, the power source control unit 71 drives the traveling dynamo-electric motor 25. As a result, the tractive force used to drive the front wheels 5 and the rear wheels 11 is supplemented and it becomes possible to distribute the force of engine power to the hydraulic pumps 72 via which the working fluid is supplied to the hydraulic cylinders 6c and the bucket cylinder 6d and the working fluid is discharged from the hydraulic cylinders 6c and the bucket cylinder 6d. In addition, if the pressure "p" indicated in the information transmitted from the pressure detectors 81 is equal to or greater than the second pressure $P_b$, which takes a value greater than the value representing the first pressure $P_a$, the power source control unit 71 drives the motor/generator 30 as a motor. The drive torque provided via the motor/generator 30 can then be directed to drive the various devices in the hybrid wheel loader 1, including the propeller shaft 15 and the hydraulic pumps 72. The processing executed in steps S19 through S23 corresponds to this operational sequence. It is to be noted that the value representing the second pressure $P_b$, too, is set in advance at the control device 75.

After engaging the motor/generator in operation as a motor in step S23, the control the vice 75 makes a decision in step S24 as to whether or not the pressure "p" at the hydraulic cylinders 6c is equal to or greater than the first pressure $P_a$ and less than the second pressure $P_b$. If it is decided that the pressure "p" at the hydraulic cylinders 6c is equal to or greater than the first pressure $P_a$ and less than the second pressure $P_b$, the power source control unit 71 stops operation of the motor/generator 30 (step S25). The operation then returns to step S1.

If, on the other hand, it is decided that the pressure "p" at the hydraulic cylinders 6c is not equal to or greater than the first pressure $P_a$ and less than the second pressure $P_b$, the control device 75 makes a decision in step S26 as to whether or not the pressure "p" at the hydraulic cylinders 6c is less than the first pressure $P_a$. If it is decided that the pressure "p" at the hydraulic cylinders 6c is less than the first pressure $P_a$, the operation returns to step S1.

If it is decided that the pressure "p" at the hydraulic cylinders 6c is less than the first pressure $P_a$, the power source control unit 71 stops operation of the traveling dynamo-electric motor 25 in step S27. The operation then returns to step S1. If it is decided in step S19 that the transmission 40 is not currently set in first gear or second gear, or if it is decided in step S20 that the pressure "p" at the hydraulic cylinders 6c is not equal to or greater than the first pressure $P_a$, the operation returns to step S1.

The following advantages are achieved with the hybrid wheel loader 1 embodying the present invention as has been described above.

(1) The motor/generator 30 is mounted between the engine 50 and the transmission 40 without using a torque converter and thus, regenerated energy from regenerative braking operation can be collected with better efficiency.

(2) The structure that includes the traveling dynamo-electric motor 25 mounted on the axis of the propeller shaft 15 assures an improvement in the efficiency with which regenerated energy is collected.

(3) The traveling dynamo-electric motor 25 can be installed without bulking up the hybrid wheel loader 1 by disposing the traveling dynamo-electric motor 25 within the front frame 3.

(4) The traveling dynamo-electric motor 25 installed within the front frame 3 is securely protected by the front frame 3 from any falling object such as the soil M or the like during work, thereby assuring a high level of safety and structural simplification.

(5) When the hybrid wheel loader 1 starts traveling operation, the traveling dynamo-electric motor 25 is engaged in operation in order to assist the engine 50. As a result, the hybrid wheel loader 1 is able to travel at high speed even at the start of the traveling operation to assure better work efficiency.

(6) During the initial phase of a traveling operation of the hybrid wheel loader 1, the traveling dynamo-electric motor 25 is engaged in operation only until the predetermined length of time $t_1$ elapses. This means that the hybrid wheel loader 1 is allowed to perform work in an eco-friendly manner without driving the traveling dynamo-electric motor 25 unnecessarily.

(7) When excavating soil M or the like with the hybrid wheel loader 1, the traveling dynamo-electric motor 25 is engaged in operation to assist the engine 50 only if the weight of the soil M or the like is equal to or greater than a predetermined level. Thus, work can be performed in an eco-friendly manner without compromising efficiency.

(8) When excavating even heavier soil M or the like, the motor/generator 30, as well as the traveling dynamo-electric motor 25, is engaged in operation. In other words, a staged assist method, whereby a greater number of motors are engaged in operation as the load increases, is adopted. This further ensures the hybrid wheel loader 1 to perform work in an eco-friendly manner without compromising the work efficiency.

The hybrid wheel loader 1 achieved in the embodiment of the present invention allows the motor/generator 30 to be replaced with a flywheel and a torque converter. This enables a hybrid wheel loader 1 of a given type to achieve versatility, i.e., to engage in operation in conjunction with the motor/generator 30 or in conjunction with a torque converter. Since the manufacturer only needs to produce a single model of the hybrid wheel loader 1, a cost reduction and an improvement in productivity can be achieved.

The following is a description of a method and a structure that may be adopted to assure such versatility.

FIG. 5 shows the area A in FIG. 2 in an enlarged sectional view, with a flywheel 91 and a torque converter 95 mounted over the area between the engine 50 and the transmission 40 where the motor/generator 30 is mounted in FIG. 4.

The flywheel 91 includes through holes 91*a* formed on the side toward the engine 50. The through holes 91*a* are formed at positions corresponding to the positions of the mounting holes 51*a* formed at the drive shaft 51 of the engine 50. The flywheel 91 is linked to the drive shaft 51 of the engine 50 via fastening members 61, such as bolts, inserted at the through holes 91*a* and fastened at the mounting holes 51*a*. Mounting holes 91*b* are formed at the flywheel 91 on the side opposite to the side of the engine 50. The axial center of the flywheel 91 is in alignment with the axial center of the drive shaft 51 of the engine 50 and thus, the flywheel 91 rotates on the axial center matching the axial center of the drive shaft 51 of the engine 50, as the drive shaft 51 of the engine 50 rotates.

The torque converter 95 includes a pump impeller linked to the drive shaft 51 of the engine 50, i.e., to the flywheel 91, a turbine liner that transmits torque from the drive shaft 51 to the transmission 40 via oil and a stator disposed between the pump impeller and the turbine liner. Through holes 95*a* are formed at the pump impeller on the side facing toward the flywheel 91. The torque converter 95 is attached to the flywheel 91 via fastening means 67, such as bolts, inserted at the insertion holes 95 and fastened at the mounting holes 91*b* at the flywheel 91. A rotating shaft 96 of the torque converter 95 functions as a rotating shaft for both the pump impeller and the turbine liner and is coaxial with the drive shaft 51 of the engine 50.

As has been described earlier in reference to FIG. 4, the transmission 40 includes the transmission bearing 41, the pump gear 42, the transmission rotating shaft 43, the gear train set over a plurality of stages and the output shaft (the last two members not shown). The pump gear 42 in the transmission 40 is linked through a spline to the turbine liner of the torque converter 95.

The flywheel 91 is housed inside the flywheel case 62. The torque converter 95 is housed inside the torque converter case 63. In addition, the transmission 40 is housed inside the transmission case 65. As has been described in reference to FIG. 4, the flywheel case 62 and the torque converter case 63, with side edges thereof partially polymerized with each other, are joined together via fastening means 64 such as bolts. The transmission case 65 and the torque converter case 63, with side edges thereof partially polymerized with each other, are joined together via fastening means 66 such as bolts.

The sum of the length $L_F$ of the flywheel 91 and the length $L_T$ of the torque converter 95, both measured along the longer side of the propeller shaft 15, matches the length $L_{M/G}$ of the motor/generator 30 in FIG. 4, measured along the longer side of the propeller shaft 15.

As long as this dimensional relationship holds, the flywheel 91 and the torque converter 95 shown in FIG. 5 can be mounted in place of the motor/generator 30 in FIG. 4.

The motor/generator 30 may be replaced with the flywheel 91 and the torque converter 95 through the following procedure. The motor/generator 30 is dismounted (the transmission 40 should be disconnected in advance) by disengaging the fastening means 61 and pulling out the rotating shaft 31 of the motor/generator 30, from the drive shaft 51 of the engine 50. As explained earlier, the through holes 91*a* at the flywheel 91 and the through holes 31*c* at the motor/generator 30 are formed at matching positions. Accordingly, the through holes 91 a at the flywheel 91 are aligned with the mounting holes 51*a* formed at the drive shaft 51 of the engine 50 and the flywheel 91 is linked to the engine 50 by fastening the flywheel 91 via the fastening means 61 at the holes. Then, the through holes 95*a* at the pump impeller of the torque converter 95 are aligned with the mounting holes 91*b* at the flywheel 91 and the pump impeller of the torque converter 95 is attached to the flywheel 91 by fastening the pump impeller via the fastening means 67.

The pump gear 42 of the transmission 40 and the turbine liner of the torque converter 95 are linked through a spline, and the transmission 40 is linked to the drive shaft 51 of the engine 50. Once the transmission 40 is linked to the drive shaft 51, the replacing procedure through which the motor/generator 30 is replaced with the flywheel 91 and the torque converter 95 is complete.

The sum of the length $L_F$ of the flywheel 91 and the length $L_T$ of the torque converter 95 is equal to the length $L_{M/G}$ of the motor/generator 30. Thus, the motor/generator 30 can be replaced with the flywheel 91 and the torque converter 95 without altering the position of the propeller shaft 15 of another component, such as the transmission 40, assumed along the lengthwise direction.

Figure 6:
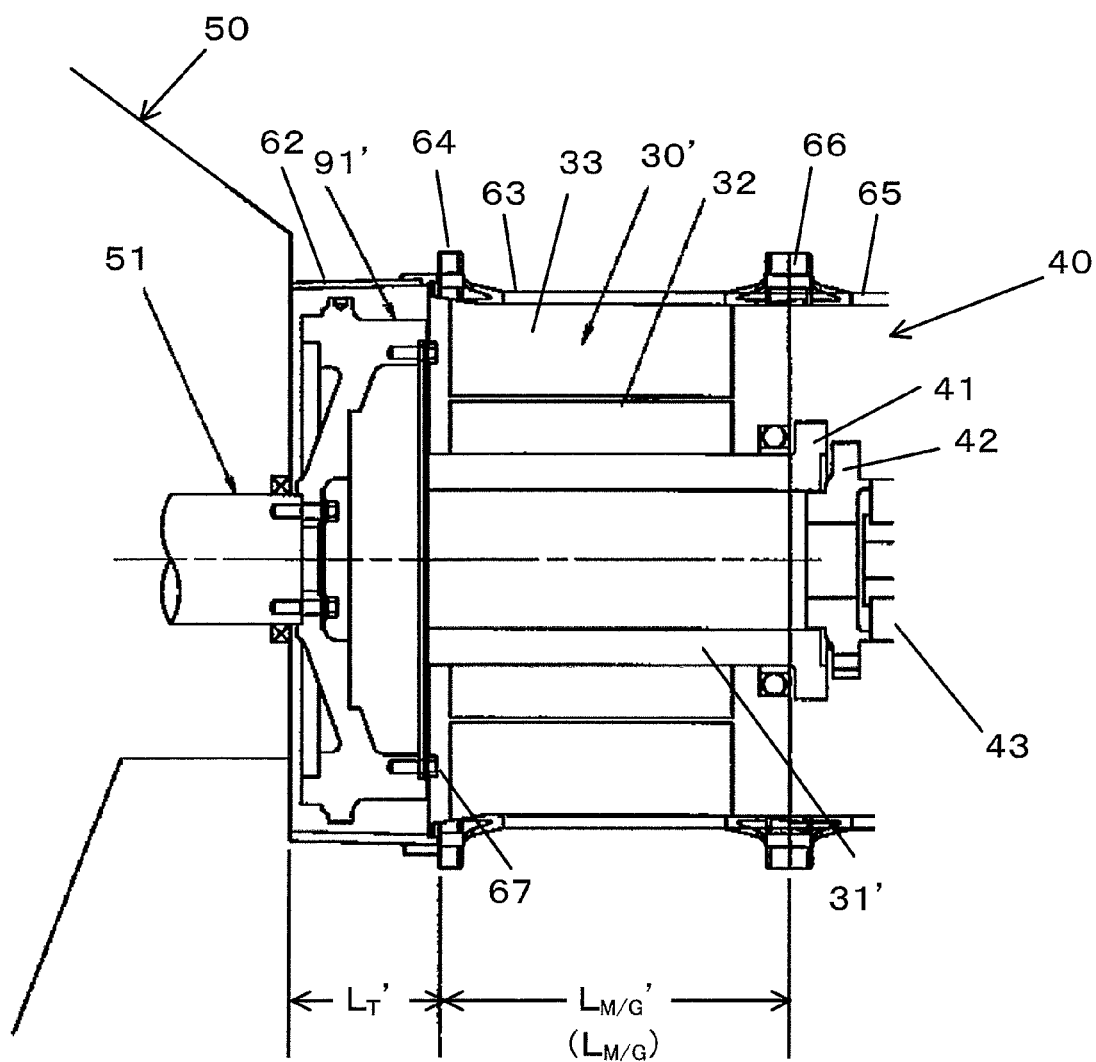

FIG. 6 shows, in a sectional view, the structure assumed in the area ranging between the engine and the transmission in conjunction with a motor/generator 30' disposed at a flywheel 91 in a standard wheel loader. It represents a comparison example, to be compared with the structure adopted in the area ranging between the engine and the transmission in the hybrid wheel loader 1 according to the present invention.

The structure shown in FIG. 6 includes a flywheel 91' and a motor/generator 30' mounted between the engine 50 and the transmission 40. Unlike the rotating shaft 31 of the motor/generator 30 shown in FIG. 4, a rotating shaft 31' of the motor/generator 30' does not include a solid bottom portion 31a. In other words, the rotating shaft 31' is a cylindrical member with an open bottom and an open top. The motor/generator 30' is locked to the flywheel 91' via fastening means 67 with one end surface of the rotating shaft 31' placed in contact with a side surface of the flywheel 91'.

Since other structural features are basically identical to those shown in FIGS. 4 and 5, the same reference numerals are assigned to those components to preclude the necessity for a repeated explanation thereof.

The motor/generator 30' in FIG. 6 corresponds to the motor/generator 30 shown in FIG. 4. This means that the length of $L_{M/G}'$ of the motor/generator 30' measured along the longer side of the propeller shaft 15, is basically equal to the length $L_{M/G}$ of the motor/generator 30 shown in FIG. 4. It is thus obvious that the structure shown in FIG. 6 will assume a lengthwise dimension greater by an extent corresponding to the length $L_F'$ of the flywheel 91' taken along the longer side of the propeller shaft 15.

In other words, the length of the propeller shaft 15 can be reduced by an extent corresponding to the length $L_F'$ of the flywheel, which, in turn, makes it possible to reduce the overall length of the hybrid wheel loader 1 and to provide the hybrid wheel loader 1 as a more compact unit.

This feature of the hybrid wheel loader 1 embodying the present invention achieves further advantages described below in addition to those described earlier.

(i) The flywheel 91 and the torque converter 95 can be mounted in place of the motor/generator 30. Thus, the hybrid wheel loader 1, achieving compatibility with both the motor/generator and with the torque converter, will contribute to a reduction in manufacturing costs and an improvement in productivity.

(ii) With the traveling dynamo-electric motor 25 mounted on the axis of the propeller shaft 15, the hybrid wheel loader 1 can be miniaturized by an extent corresponding to the length $L_F'$ of the flywheel.

It is to be noted that the traveling dynamo-electric motor 25 and the motor/generator 30 are each engaged in operation upon deciding that the cylinder pressure "p" has reached a threshold value in the embodiment described above. The rotation rate of the engine 50 becomes lower when the soil M or the like forms a load exceeding the maximum rotational torque of the engine 50. Accordingly, the rotation rate of the engine 50 may be detected and the traveling dynamo-electric motor 25 or the motor/generator 30 may be engaged in operation based upon the detected value. However, when controlling the operation of each motor based upon the rotation rate of the engine 50, measures for detecting that the rotation rate of the engine 50, having exceeded the threshold value, has come down to a level equal to or less than the threshold value, need to be devised.

The traveling dynamo-electric motor 25 or the motor/generator 30 may be engaged in operation in order to assist the engine 50 under conditions other than when the predetermined length of time $t_1$ has yet to elapse following the start of an accelerator pedal operation or when the soil M or the like forms a load exceeding the maximum rotational torque that the engine is capable of generating. For instance, the traveling dynamo-electric motor 25 or the motor/generator 30 may be engaged in operation whenever the tractive force provided by the engine 50 is not sufficient.

It is to be noted that while the power source control unit 71 in the embodiment described above makes a decision in step S2, step S3 and step S7 in FIG. 11 as to whether or not the charge quantity C at the electricity storage device 26 is equal to $C_{FULL}$, it may make a decision alternative to the decision as to whether or not the charge quantity is equal to $C_{FULL}$. For instance, the power source control unit 71 may make a decision as to whether or not the charge quantity C at the electricity storage device 26 is equal to a charge quantity C represented by a preselected value, which is sufficient to drive the traveling dynamo-electric motor 25 or the motor/generator 30. In addition, the power source control unit 71 may make a decision pertaining to the SOC (state of charge) in the electricity storage device 26, instead of the charge quantity C at the electricity storage device 26. In such a case, the power source control unit 71 should calculate the SOC based upon the overall voltage at the electricity storage device 26, detected via a voltage sensor, a charge current or a discharge current detected by a current sensor, or the like.

Furthermore, the hybrid wheel loader according to the present invention allows for a range of variations without departing from the scope of the invention, as long as it comprises an engine, a motor/generator that includes a rotating shaft directly attached to an output shaft of the engine, a transmission that includes an input shaft attached to the rotating shaft of the motor/generator, a propeller shaft disposed on the output side of the transmission and driven via an output shaft of the transmission, an electricity storage device and a control device that stores electricity into the electricity storage device by collecting electrical energy generated via the motor/generator.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2010-121389 filed May 27, 2010

The invention claimed is:

1. A hybrid wheel loader comprising:
   an engine that includes an output shaft;
   a motor/generator that includes a rotating shaft directly attached to the output shaft of the engine;
   a transmission that includes an input shaft attached to the rotating shaft of the motor/generator, and an output shaft;
   a propeller shaft disposed on an output side of the transmission and driven via the output shaft of the transmission;
   an electricity storage device;
   a control device that stores electricity into the electricity storage device by collecting electrical energy at the motor/generator; and
   a traveling dynamo-electric motor disposed on an output axis of the propeller shaft.

2. The hybrid wheel loader according to claim 1, wherein:
   the traveling dynamo-electric motor is disposed inside a front frame.

3. The hybrid wheel loader according to claim 1, wherein:
   when a tractive force provided by the engine is not sufficient, the control device drives the traveling dynamo-electric motor with electric power from the electricity storage device.

4. The hybrid wheel loader according to claim 3, wherein:
the control device drives the traveling dynamo-electric motor with electric power from the electricity storage device at a traveling operation start.

5. The hybrid wheel loader according to claim 3, further comprising:
a bucket that swings upward/downward; and
a height detector that detects a height of the bucket, wherein:
upon deciding that the height of the bucket detected by the height detector is smaller than a predetermined height, the control device drives the traveling dynamo-electric motor with electric power from the electricity storage device.

6. The hybrid wheel loader according to claim 5, further comprising:
a cylinder that causes the bucket to swing upward/downward; and
a pressure detector that detects a pressure at the cylinder, wherein:
upon deciding that the pressure at the cylinder detected by the pressure detector is greater than a first pressure, the control device drives the traveling dynamo-electric motor with electric power from the electricity storage device.

7. The hybrid wheel loader according to claim 6, wherein:
upon deciding that the pressure at the cylinder detected by the pressure detector is equal to or greater than a second pressure that is higher than the first pressure, the control device drives the motor/generator with electric power from the electricity storage device.

8. The hybrid wheel loader according to claim 6, wherein:
upon deciding that the treasure at the cylinder detected by the pressure detector is less than the first pressure while the driving dynamo-electric motor with electric power from the electricity storage device, the control device stops driving the traveling dynamo-electric motor.

9. The hybrid wheel loader comprising:
an engine that includes an output shaft;
a motor/generator that includes a rotating shaft directly attached to the output shaft of the engine;
a transmission that includes an input shaft attached to the rotating shaft of the motor/generator, and an output shaft;
a propeller shaft disposed on an output side of the transmission and driven via the output shaft of the transmission;
an electricity storage device;
a control device that stores electricity into the electricity storage device by collecting electrical energy at the motor/generator; and
wherein, if a change quantity, indicating an extent to which the electricity storage device is charged, is less than a predetermined quantity during deceleration, the control device stores electrical energy at the motor/generator and the traveling dynamo-electric motor into the electricity storage device.

10. A hybrid wheel loader comprising:
an engine that includes an output shaft;
a motor/generator that includes a rotating shaft directly attached to the output shaft of the engine;
a transmission that includes an input shaft attached to the rotating shaft of the motor/generator, and an output shaft;
a propeller shaft disposed on an output side of the transmission and driven via the output shaft of the transmission;
an electricity storage device;
a control device that stores electricity into the electricity storage device by collecting electrical energy at the motor/generator; and
wherein the hybrid wheel loader is structured so as to allow the motor/generator, attached to the output shaft of the engine, to be disengaged for replacement with a flywheel and a torque converter.

* * * * *